(12) United States Patent
Tang

(10) Patent No.: US 10,904,881 B2
(45) Date of Patent: Jan. 26, 2021

(54) METHOD ENABLING TERMINAL TO MAINTAIN UPLINK SYNCHRONIZATION, AND TERMINAL

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/344,792

(22) PCT Filed: Mar. 21, 2017

(86) PCT No.: PCT/CN2017/077558
§ 371 (c)(1),
(2) Date: Apr. 24, 2019

(87) PCT Pub. No.: WO2018/170742
PCT Pub. Date: Sep. 27, 2018

(65) Prior Publication Data
US 2019/0342887 A1 Nov. 7, 2019

(51) Int. Cl.
*H04W 72/04* (2009.01)
*H04L 1/18* (2006.01)
*H04L 5/00* (2006.01)
*H04W 56/00* (2009.01)

(52) U.S. Cl.
CPC ....... *H04W 72/0446* (2013.01); *H04L 1/1887* (2013.01); *H04L 5/0032* (2013.01); *H04L 5/0082* (2013.01); *H04W 56/001* (2013.01); *H04W 72/0413* (2013.01)

(58) Field of Classification Search
None
See application file for complete search history.

(56) References Cited

U.S. PATENT DOCUMENTS

2010/0238908 A1   9/2010  Wu
2012/0008600 A1*  1/2012  Marinier ........... H04W 74/0833
                                                        370/336
(Continued)

FOREIGN PATENT DOCUMENTS

CN    101222775    7/2008
CN    101771517    7/2010
(Continued)

OTHER PUBLICATIONS

WIPO, ISR for PCT/CN2017/077558, dated Nov. 23, 2017.
(Continued)

Primary Examiner — Jamaal Henson
(74) Attorney, Agent, or Firm — Hodgson Russ LLP (57) ABSTRACT

Embodiments of the present disclosure disclose a method and a terminal for maintaining uplink synchronization of a terminal, the method including: triggering, by the terminal, an uplink alignment timer UAT, and receiving a timing advance command TAC within a duration of the UAT; and losing uplink synchronization in the case where the terminal does not receive the TAC within the duration of the UAT.

16 Claims, 5 Drawing Sheets

(56) References Cited

U.S. PATENT DOCUMENTS

| | | | | |
|---|---|---|---|---|
| 2012/0014371 A1* | 1/2012 | Weng | ............... | H04J 3/0682 |
| | | | | 370/350 |
| 2012/0257570 A1* | 10/2012 | Jang | ............... | H04W 28/04 |
| | | | | 370/328 |
| 2013/0279493 A1* | 10/2013 | Yi | ............... | H04W 56/0005 |
| | | | | 370/350 |
| 2015/0351127 A1 | 12/2015 | Park et al. | | |

FOREIGN PATENT DOCUMENTS

| | | |
|---|---|---|
| CN | 101772150 | 7/2010 |
| CN | 102223703 | 10/2011 |
| CN | 102932900 | 2/2013 |
| WO | 2012134071 | 10/2012 |
| WO | 2014112744 | 7/2014 |

OTHER PUBLICATIONS

EPO, Office Action for EP Application No. 17901562.3, dated Oct. 7, 2019.
CNIPA, First Office Action for CN Application No. 201780057853.0, dated Dec. 9, 2019.

* cited by examiner

METHOD ENABLING TERMINAL TO MAINTAIN UPLINK SYNCHRONIZATION, AND TERMINAL

CROSS-REFERENCE TO RELATED APPLICATION

This application is a National Stage Entry of International Application No. PCT/CN2017/077558, filed Mar. 21, 2017, the entire disclosure of which is incorporated herein by reference.

TECHNICAL FIELD

The present disclosure relates to the field of communications technologies, and more particularly to a method and terminal for maintaining uplink synchronization of a terminal.

BACKGROUND

In a long term evolution (LTE) communication system, uplink time alignment is necessary.

Uplink timing alignment may also be understood as uplink synchronization, which is different from downlink synchronization (in an LTE communication system, downlink synchronization is obtained by a terminal by monitoring a primary synchronization signal (PSS)/secondary synchronization signal (SSS) signal to obtain the downlink timing). In an LTE communication system, a terminal needs to communicate with a network-side device, and one of the necessary steps is to obtain uplink synchronization through a random access (RA) process. Specifically, the terminal sends MSG1 (open-loop power control, a process in which the terminal gradually increases the power transmitting probe), i.e., RA preamble, to the network-side device via the RA, and the network-side device estimates the offset of the uplink time after receiving the preamble, and sends the uplink time adjustment to the terminal via MSG2 of the RA (i.e., an acknowledgement ACK returned by the ENB receiving the MSG1 at a certain time). The uplink time adjustment of the terminal is always based on the downlink timing, that is, the terminal needs to obtain the downlink implementation by using the PSS/SSS first, and then adjust the uplink time by using the uplink time adjustment amount transmitted by the network side device.

It should be noted that the information disclosed in the background section above is only for enhancing the understanding of the background of the present disclosure, and thus may include information that does not constitute prior art known to those of ordinary skill in the art.

SUMMARY

Embodiments of the present disclosure provide a method and a terminal for maintaining uplink synchronization of a terminal.

Embodiments of the present disclosure provide a method and a terminal for maintaining uplink synchronization of a terminal.

triggering, by the terminal, an uplink alignment timer UAT, and receiving a timing advance command TAC within a duration of the UAT; and losing uplink synchronization in the case where the terminal does not receive the TAC within the duration of the UAT.

obtaining, by the terminal, configuration information of the UAT through radio resource control RRC signaling; or, acquiring, by the terminal, the configuration information of the UAT through system broadcast information.

In one possible design, the UAT corresponds to a time advance group TAG.

In a possible design, the TAG includes a time alignment timer TAT and the UAT, and the triggering, by the terminal, an uplink alignment timer UAT includes:

triggering, by the terminal, the UAT when the TAT fails; or, triggering, by the terminal, the UAT when triggering the TAT, and the duration of the UAT is greater than or equal to a duration of the TAT.

In a possible design, when the TAT fails, the method further includes: the terminal interrupting response to:

clearing a hybrid automatic repeat request HARQ buffer, clearing a physical uplink control channel PUCCH resource, and marking a running TAT other than the TAT as failed.

In one possible design, the method further includes:

transmitting, by the terminal, uplink time alignment request information through a first cell within the duration of the UAT, wherein the first cell is a cell corresponding to a TAG other than the TAG of a first media access control MAC entity; or, transmitting, by the terminal, uplink time alignment request information through a second cell within a duration of the UAT, wherein the second cell is a cell corresponding to a TAG of a second MAC entity, and the second MAC entity is different from the first MAC entity, wherein the uplink time alignment request information is used to notify a target cell that the TAT included in the TAG corresponding to the UAT has failed, so that the target cell transmits a preset configuration resource on a downlink channel, the preset configuration resource is used by the terminal to transmit uplink data on the target cell having the failed TAT, and the target cell is a cell that needs to obtain an uplink time adjustment amount again.

In one possible design, the method further includes:

receiving, by the terminal, a time adjustment instruction including an uplink time adjustment amount and a target TAG ID through the first cell; or, receiving, by the terminal, a time adjustment instruction including an uplink time adjustment amount, a first MAC entity identity ID, and a target TAG ID through the second cell.

In one possible design, the method further includes:

receiving, by the terminal, preset information, wherein the preset information includes the uplink time adjustment amount, wherein the uplink time adjustment amount is determined by the first cell according to a relative position between the first cell and the target cell; or, the uplink time adjustment amount is determined by the second cell according to a relative position between the second cell and the target cell; or, the uplink time adjustment amount is determined by the target cell according to a received preset uplink control information, which includes a scheduling request SR or a sounding reference signal SRS.

In one possible design, the method further includes:

performing, by the terminal, in the case where the UAT fails, at least one of:

determining that the target cell loses uplink synchronization, clearing hybrid automatic repeat request HARQ buffer for all serving cells, notifying radio resource control RRC entity to release PUCCH and SRS resources for all serving cells, clearing configured downlink allocation and uplink authorization, and marking a running TAT other than the TAT as failed.

According to a second aspect, an embodiment of the present disclosure provides a terminal having a function for implementing the behavior of the terminal in the above-described method design. The functions may be implemented by hardware, or may be implemented by hardware executing a corresponding software. The hardware or software includes one or more modules corresponding to the functions described above.

In one possible design, the terminal includes a processor configured to support the terminal in performing the corresponding functions of the method described above. Further, the terminal may further include a transceiver for supporting communication between the terminal and a network-side device. Further, the terminal may further include a memory for coupling to a processor that stores program instructions and data necessary for the terminal.

According to a third aspect, an embodiment of the present disclosure provides a computer-readable storage medium in which instructions are stored so that a computer executes the method of the first aspect as described above when it runs on the computer.

According to a fourth aspect, an embodiment of the present disclosure provides a computer program product including instructions that, when run on a computer, cause the computer to execute the method of the first aspect described above.

It should be understood that the above general description and the following detailed description are merely exemplary and explanatory, and are not limiting of the present disclosure.

It should be understood that the above general description and the following detailed description are merely exemplary and explanatory, and are not limiting of the present disclosure.

DETAILED DESCRIPTION

The implementations in the embodiments of the present disclosure will be described below with reference to the accompanying drawings.

Figure 1:
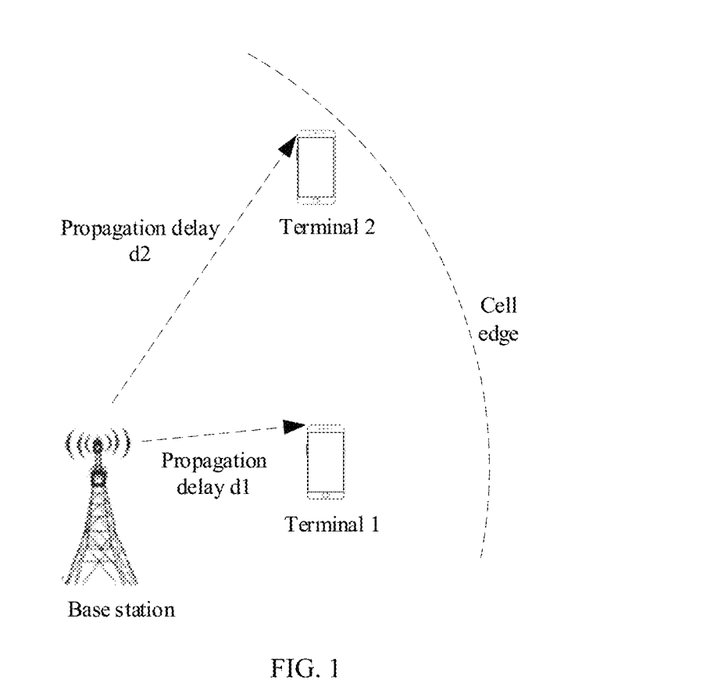
FIG. 1 is a scenario of an example communication cell having a plurality of terminals in an exemplary LTE communication system.
Figure 2:
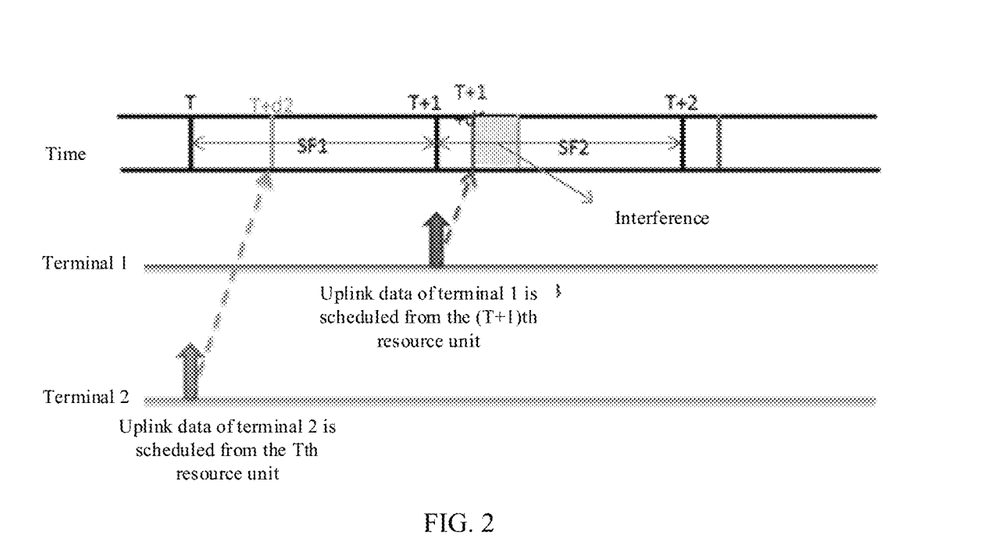
FIG. 2 is a schematic diagram of uplink signal time interference of different propagation delays of multiple terminals in an exemplary LTE communication system.

FIG. 1 illustrates a scenario of an example communication cell having a plurality of terminals in a LTE communication system. As shown in FIG. 1, it is assumed that one cell has two terminals, i.e., the terminal 1 closer to the base station and having a signal propagation delay to the base station of d1, and the terminal 2 close to the edge of the cell and having a signal propagation delay to the base station of d2. Further, it is assumed that each terminal has only one carrier connection (i.e., a scenario in which no carrier aggregation (CA) or dual connectivity (DC) is not considered). Obviously, because the terminal 1 is closer to the base station, d1<d2. In the scenario of this assumption, if the uplink time is not aligned (i.e., uplink synchronization), the cases shown in FIG. 2 will occur, i.e., (1) because the propagation delays from the terminal 1 and the terminal 2 to the base station are different, the arrival time of the uplink signal will also be different in the network-side device; and (2) it is assumed that the scheduled subframe of the terminal 2 is SF1, and the scheduled subframe of the terminal 1 is SF2, and because the uplink signal arrival time is inconsistent, a rear part of the signal of the terminal 2 and a front part of the signal of the terminal 1 are interfered with each other. As can be seen, uplink time alignment is necessary.

Figure 3:
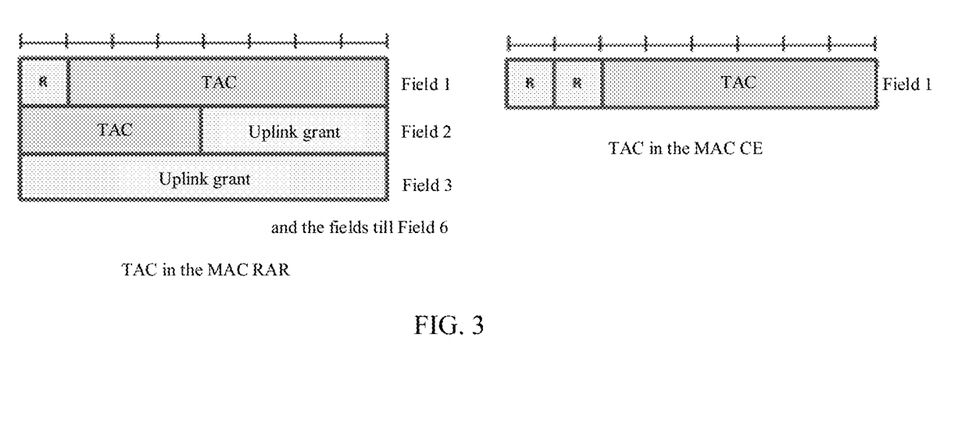
FIG. 3 is a schematic diagram of a network-side device transmitting TAC to a terminal in an exemplary LTE communication system.

As shown in FIG. 3, in an LTE communication system, a network-side device may send a timing advance command (TAC) to a terminal in two ways, one in a Random Access Response (RAR), and the other one is in a MAC control element (MAC CE), as shown in the figure below. The TAC transmitted by the RAR generally occurs when the terminal performs initial access, handoff, radio link failure (RLF), or the like, so as to obtain an initial uplink time adjustment amount. When the TAC is transmitted through the MAC CE, the network side device can transmit the uplink time adjustment amount through the uplink data when the terminal has an RRC connection.

The network side device configures a time alignment timer (TAT) for the terminal, and the terminal determines, according to the TAT, how long the alignment state can last. The trigger or re-trigger of TAT is generally received by the terminal, and the duration of TAT is configured by the network side device. If the terminal does not receive the TAC within the duration of the TAT, it is considered that the uplink is out of sync. If the uplink is out of sync, the terminal needs to clear all HARQ buffers, release PUCCH resources, and the like at the same time. If the uplink synchronization needs to be re-obtained, the terminal needs to initiate the random access procedure again.

In addition, in a scenario where the terminal supports multi-connection (the multi-connection may be implemented by means of carrier aggregation CA or dual-connection DC), there is a case that one connection loses uplink synchronization (e.g., no data is received/transmitted within the TAT time), while the other connection remains uplink synchronization. In this case, a connection that loses uplink synchronization (if it is a primary cell PCell) will clear all physical uplink control channel (PUCCH) resources or a hybrid automatic repeat request (HARQ) buffer, causing the other connection that still maintains uplink synchronization to be unavailable.

Figure 4:
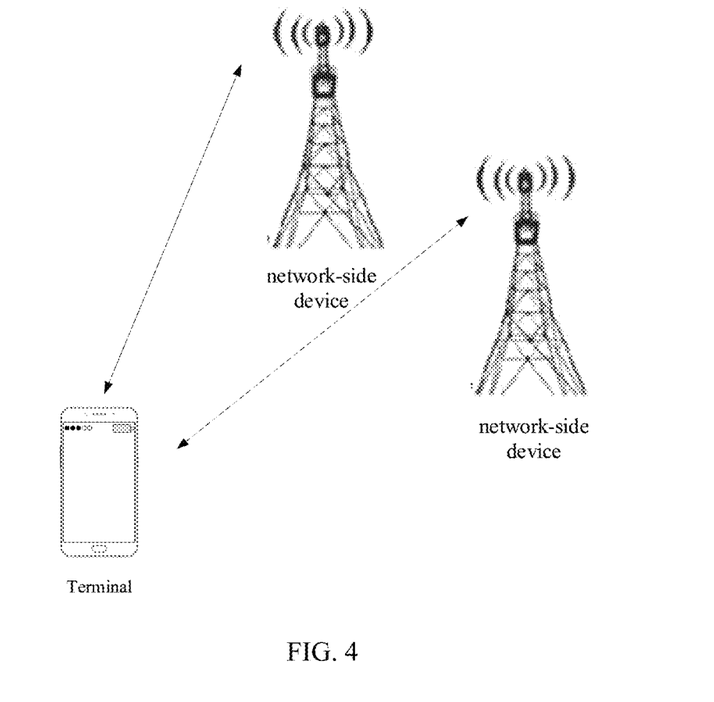
FIG. 4 is a schematic diagram of a network architecture of an example communication system according to an embodiment of the present disclosure.

Referring to FIG. 4, FIG. 4 is a possible network architecture of an example communication system according to an embodiment of the present disclosure. The example communication system may be a 4G LTE communication system or a 5G NR communication system, specifically including a network side device and a terminal. When the terminal accesses a mobile communication network provided by the network side device, the terminal and the network side device may communicate with each other by using a wireless link. The communication connection mode may be a single-connection mode or a dual-connection mode or a multi-connection mode. However, when the communication connection mode is a single-connection mode, the network side device may be an LTE base station or an NR base station. When the communication mode is a dual-connection mode (specifically, the communication mode may be implemented by using a carrier aggregation CA technology, or multiple network side devices), and when the terminal is connected to multiple network side devices, the multiple network side devices may be a primary and a secondary base station, and data may backhaul between the base stations via backhaul link. The primary base station may be an LTE base station and the secondary base station may be an LTE base station, or, the primary base station may be an NR base station and the secondary base station may be an LTE base station, or, the primary base station may be an NR base station and the secondary base station may be an NR base station. In the present disclosure, the terms "network" and "system" are often used interchangeably, and those skilled in the art can understand the meaning thereof. The terminals to which embodiments of the present disclosure relate may include various hand-held devices, in-vehicle devices, wearable devices, computing devices, or other processing devices connected to wireless modems, as well as various forms of user equipment (UE), mobile stations (MS), terminal devices, and the like. For ease of description, the devices mentioned above are collectively referred to as terminals.

Figure 5:
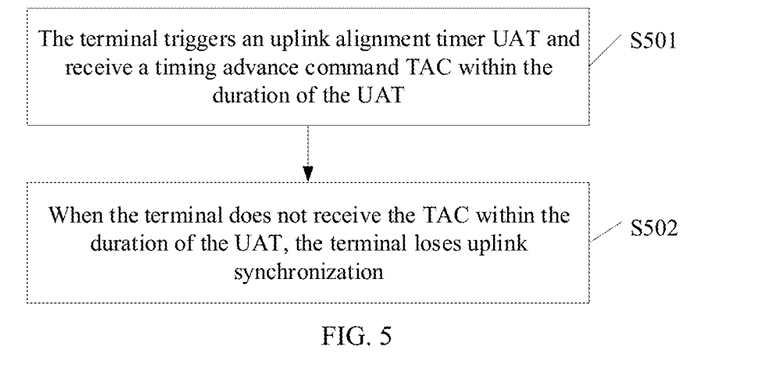
FIG. 5 is a communication diagram of a method of maintaining uplink synchronization of a terminal according to an embodiment of the present disclosure.

Referring to FIG. 5, FIG. 5 is a method of maintaining uplink synchronization of a terminal according to an embodiment of the present disclosure, the method including a section 501, specifically as follows:

In the section 501, the terminal triggers an uplink alignment timer UAT and receive a timing advance command TAC within the duration of the UAT.

In section 502, when the terminal does not receive the TAC within the duration of the UAT, the terminal loses uplink synchronization.

It can be seen that, in the embodiment of the present disclosure, the terminal triggers the uplink alignment timer UAT, receives the timing advance command TAC within the duration of the UAT, and loses uplink synchronization when it does not receive the TAC within the duration of the UAT. It can be seen that, in the embodiment of the present disclosure, by configuring an uplink alignment timer UAT, it is ensured that the uplink synchronization is lost only when the TAC is not received within a valid time period of the UAT. That is, when the original TAT fails, the terminal does not immediately lose the uplink synchronization. Even if the TAT fails, the uplink synchronization can be obtained, so that the signaling overhead and the delay of the terminal to obtain the synchronization again through the random access channel RACH can be saved.

In one possible example, before the terminal triggers the uplink alignment timer UAT, the method further includes:

obtaining, by the terminal, configuration information of the UAT by radio resource control RRC signaling, wherein the UAT acquired by radio resource control RRC signaling may be a terminal-specific UAT, that is, the duration of the UAT may be different for different terminals. Or, obtaining, by the terminal, configuration information of the UAT through system broadcast information; wherein the UAT acquired through the system broadcast information may be a common UAT, that is, the UAT corresponding to the terminal within the system is the same, and the system broadcast information may be, for example, a System Information Block (SIB) message, such as a SIBi message, where i is an integer from 1 to 12.

In one possible example, the UAT corresponds to a time advance group (TAG).

The TAG described in release 11 of the 3rd generation partnership project (3GPP) protocol may consist of one or more serving cells. In the TAG, the uplink timing advance of the terminal is consistent, and the TAG includes a TAG ID and a time alignment timer TAT. The TAG may be specifically divided into a pTAG and a sTAG, where the pTAG refers to a TAG including a primary serving cell, and the sTAG refers to a TAG including a secondary serving cell.

Furthermore, the TAG may belong to a different media access control (MAC) entity.

In addition, the network side device may configure different timer configurations for different TAGs. For example, configuring the first TAG to include only the TAT, and configuring the second TAG to include both the UAT and the TAT.

For example, the network side device may configured a pTAG in a MAC entity to include a UAT and a TAT, and configure the sTAG in the MAC entity to include only one TAT. This configuration may ensure that the uplink synchronization can be obtained by the secondary serving cell when the primary serving cell loses uplink synchronization.

For another example, the network side device may configure that each sTAG of all sTAGs of a MAC entity includes only one TAT, that the pTAG of the MAC entity includes a TAT and a UAT, that each sTAG of all sTAGs of another MAC entity includes only one TAT, and that the pTAG of the another MAC entity includes a TAT and a UAT;

For another example, in the case of multiple MAC entities, that is, in a multi-connection scenario, the network side device may include a TAT and a UAT for the pTAG under the MAC entity corresponding to the MCG of the primary cell group, and configure all TAGs (pTAGs and sTAGs) in the other MAC entities to include only one TAT.

In one possible example, the TAG includes a time alignment timer TAT and the UAT, and the terminal triggering the uplink alignment timer UAT may include:

triggering, by the terminal, the UAT when the TAT fails; or, triggering, by the terminal, the UAT when triggering the TAT, and the duration of the UAT is greater than or equal to the duration of the TAT.

In one possible example, the terminal, when the TAT fails, the method further includes: the terminal interrupting response to:

clearing a hybrid automatic repeat request HARQ buffer, clearing a physical uplink control channel PUCCH resource, and marking a running TAT other than the TAT as failed.

In one possible example, the method further includes:

transmitting, by the terminal, uplink time alignment request information through a first cell within the duration of the UAT, wherein the first cell is a cell corresponding to a TAG other than the TAG of a first media access control MAC entity; or, transmitting, by the terminal, uplink time alignment request information through a second cell within a duration of the UAT, wherein the second cell is a cell corresponding to a TAG of a second MAC entity, and the second MAC entity is different from the first MAC entity, wherein the uplink time alignment request information is used to notify a target cell that the TAT included in the TAG corresponding to the UAT has failed, so that the target cell transmits a preset configuration resource on a downlink channel, the preset configuration resource is used by the terminal to transmit uplink data on the target cell having the failed TAT, and the target cell is a cell that needs to obtain an uplink time adjustment amount again.

In one possible example, the method further includes:

receiving, by the terminal, a time adjustment instruction including an uplink time adjustment amount and a target TAG ID through the first cell; or, receiving, by the terminal, a time adjustment instruction including an uplink time adjustment amount, a first MAC entity identity ID, and a target TAG ID through the second cell.

In one possible example, the method further includes:

receiving, by the terminal, preset information, wherein the preset information includes the uplink time adjustment amount, wherein the uplink time adjustment amount is determined by the first cell according to a relative position between the first cell and the target cell; or, the uplink time adjustment amount is determined by the second cell according to a relative position between the second cell and the target cell; or, the uplink time adjustment amount is determined by the target cell according to a received preset uplink control information, the preset uplink control information includes a scheduling request (SR) or a sounding reference signal (SRS).

In one possible example, the method further includes:

performing, by the terminal, in the case where the UAT fails, at least one of:

determining that the target cell loses uplink synchronization, clearing hybrid automatic repeat request HARQ buffer for all serving cells, notifying radio resource control RRC entity to release PUCCH and SRS resources for all serving cells, clearing configured downlink allocation and uplink authorization, and marking a running TAT other than the TAT as failed.

In the embodiment, the UAT failure may specifically indicate that the terminal does not receive any uplink time adjustment amount instruction within the duration of the UAT.

Implementations of the embodiments of the present disclosure are described above mainly from the perspective of interaction between various network elements. It is understood that the terminal and the network-side device, in order to implement the above-described functions, include hardware structures and/or software modules that perform respective functions. It should be readily appreciated by those skilled in the art that the present disclosure can be implemented in the form of hardware or a combination of hardware and computer software in conjunction with the unit and algorithm steps of the various examples described in the embodiments disclosed herein. Whether a function is performed in a hardware or computer software-driven manner depends on the particular application and design constraints of the implementation. One skilled in the art may use different methods for each particular application to implement the described functions, but such implementation should not be considered outside the scope of the present disclosure.

According to the embodiment of the present disclosure, the terminal and the network-side device may be divided into functional units according to the above-described method examples. For example, each functional unit may be divided into functional units corresponding to each function, or two or more functions may be integrated into one processing unit. The integrated units may be implemented in the form of hardware or in the form of software functional units. It should be noted that the division of the units in the embodiments of the present disclosure is illustrative, and is only one logical function division, and may be implemented in another manner.

Figure 6A:
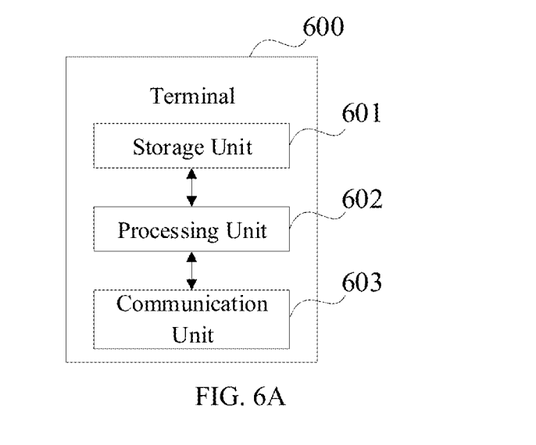
FIG. 6A is a schematic structural diagram of a terminal according to an embodiment of the present disclosure.

In the case of using an integrated unit, FIG. 6A shows a possible schematic structural diagram of a first core network device according to the embodiment described above. The terminal 600 includes a processing unit 602 and a communication unit 603. The processing unit 602 is used to control and manage the operation of the terminal, for example, the processing unit 602 is used to support the terminal in performing steps 501 and 502 and/or other processes of the techniques described herein in FIG. 5. The communication unit 603 is configured to support communication between a terminal and another device, such as a network-side device shown in FIG. 4. The terminal may further include a storage unit 601 for storing program code and data of the terminal.

The processing unit 602 may be a processor or a controller, such as a central processing unit (CPU), a general purpose processor, a digital signal processor (DSP), an application-specific integrated circuit (ASIC), a field programmable gate array (FPGA), or other programmable logic devices, transistor logic devices, hardware components, or any combination thereof. It may implement or perform various exemplary logic blocks, modules, and circuits described in conjunction with the disclosure of the present disclosure. The processor may also be a combination of implementing computing functions, such as including a combination of one or more microprocessors, a combination of a DSP and a microprocessor, and the like. The communication unit 603 may be a transceiver, a transceiver circuit, or the like, and the storage unit 601 may be a memory.

In the embodiment, the processing unit 602 is configured to trigger an uplink alignment timer UAT, and request a timing advance command TAC through the communication unit within a duration of the UAT, and losing uplink synchronization when no TAC is received within the duration of the UAT.

In one possible example, the processing unit is further configured to obtain configuration information of the UAT by radio resource control RRC signaling before triggering an uplink alignment timer UAT; Alternatively, the configuration information of the UAT is obtained by the system broadcast information.

In one possible example, the UAT corresponds to a time advance group TAG.

In one possible example, the TAG includes a time alignment timer TAT and the UAT, and for triggering the UAT, the processing unit is specifically configured to: trigger the UAT when the TAT fails; or, trigger the UAT when the TAT is triggered, and the duration of the UAT is greater than or equal to a duration of the TAT.

In one possible example, the processing unit is further configured to, when the TAT fails, interrupt response to:

learning a hybrid automatic repeat request HARQ buffer, clearing a physical uplink control channel PUCCH resource, and marking a running TAT other than the TAT as failed.

the processing unit is further configured to transmit uplink time alignment request information through a first cell within the duration of the UAT, wherein the first cell is a cell corresponding to a TAG other than the TAG of a first media access control MAC entity; or, to transmit uplink time alignment request information through a second cell within the duration of the UAT, wherein the second cell is a cell corresponding to a TAG of a second MAC entity, and the second MAC entity is different from the first MAC entity, wherein the uplink time alignment request information is used to notify a target cell that the TAT included in the TAG corresponding to the UAT has failed, so that the target cell transmits a preset configuration resource on a downlink channel, the preset configuration resource is used by the terminal to transmit uplink data on a target cell having the failed TAT, and the target cell is a cell that needs to obtain an uplink time adjustment amount again.

In one possible example, the processing unit is further configured to receive a time adjustment instruction through the communication unit through the first cell, the time adjustment instruction including an uplink time adjustment amount and a target TAG ID; or, to receive a time adjustment instruction through the communication unit through the second cell, the time adjustment instruction including an uplink time adjustment amount, a first MAC entity identity ID, and a target TAG ID.

In one possible example, the processing unit is further configured to receive preset information through the communication unit, the preset information including the uplink time adjustment amount, wherein the uplink time adjustment amount is determined by the first cell according to a relative position between the first cell and the target cell; or, the uplink time adjustment amount is determined by the second cell according to a relative position between the second cell and the target cell; or, the uplink time adjustment amount is determined by the target cell according to a received preset uplink control information, which includes a scheduling request SR or a sounding reference signal SRS.

In one possible example, the processing unit is further configured to, when the UAT fails, perform at least one of:

determining that the target cell loses uplink synchronization, clearing hybrid automatic repeat request HARQ buffer for all serving cells, notifying radio resource control RRC entity to release PUCCH and SRS resources for all serving cells, clearing configured downlink allocation and uplink authorization, and marking a running TAT other than the TAT as failed.

Figure 6B:
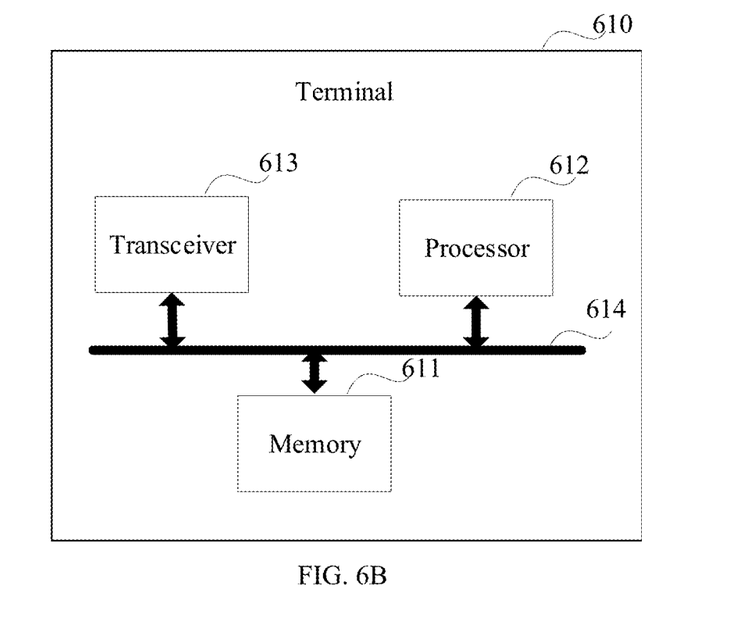
FIG. 6B is a schematic structural diagram of another terminal according to an embodiment of the present disclosure.

When the processing unit 602 is a processor, the communication unit 603 is a communication interface, and the storage unit 601 is a memory, the terminal involved in the embodiment of the present disclosure may be the terminal shown in FIG. 6B.

Referring to FIG. 6B, the terminal 610 includes a processor 612, a communication interface 613, and a memory 611. Optionally, the terminal 610 may further include a bus 614. In the embodiment, the communication interface 613, the processor 612, and the memory 611 may be interconnected via the bus 614. The bus 614 may be a peripheral component interconnect (PCI) bus, an extended industry standard architecture (EISA) bus, or the like. The bus 614 may include an address bus, a data bus, a control bus, and the like. For ease of illustration, FIG. 6B shows only one thick line, but does not indicate only one bus or one type of bus.

The terminal shown in FIG. 6A or FIG. 6B may also be understood as an apparatus for a terminal, and the embodiment of the present disclosure is not limited thereto.

Figure 7:
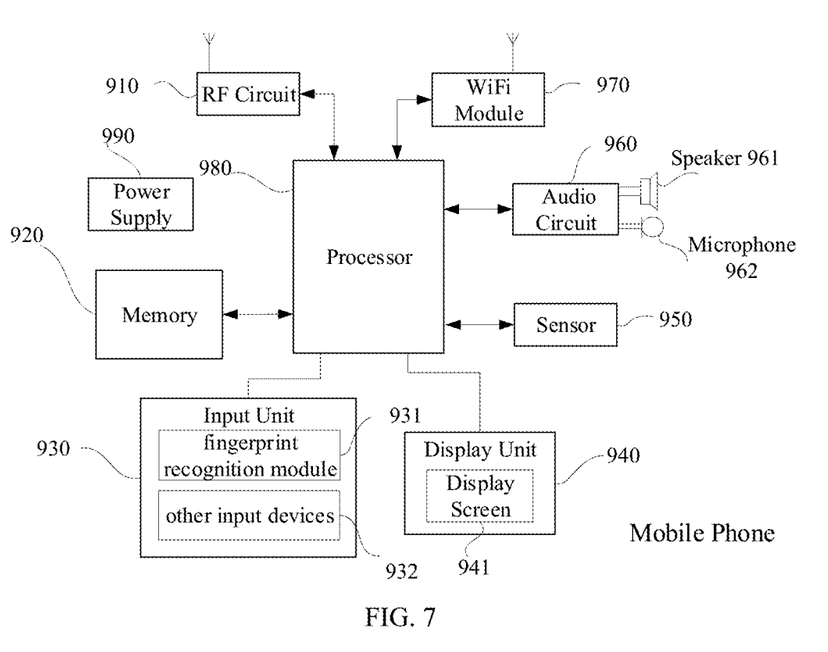
FIG. 7 is a schematic structural diagram of another terminal according to an embodiment of the present disclosure.

An embodiment of the present disclosure also provides another terminal. As shown in FIG. 7, for ease of illustration, only a part related to the embodiment of the present disclosure is shown, and specific technical details are not disclosed. Reference is made to the method part of the embodiment of the present disclosure. The terminal may be any terminal device including a mobile phone, a tablet computer, a PDA (Personal Digital Assistant), a POS (Point of Sales), a vehicle-mounted computer, or the like. For example, the terminal is a mobile phone.

FIG. 7 is a block diagram showing a partial configuration of a mobile phone related to a terminal according to an embodiment of the present disclosure. Referring to FIG. 7, the mobile phone includes components such as a radio frequency (RF) circuit 910, a memory 920, an input unit 930, a display unit 940, a sensor 950, an audio circuit 960, a wireless fidelity (WiFi) module 970, a processor 980, a power supply 990, and the like. It will be appreciated by those skilled in the art that the structure of the mobile phone shown in FIG. 7 does not constitute a limitation on the mobile phone, and may include more or fewer components than those shown, or may combine certain components, or may have different component arrangements.

The respective components of the mobile phone will be described in detail with reference to FIG. 7.

The RF circuit 910 may be used to receive and transmit information. Generally, the RF circuit 910 includes, but is not limited to, an antenna, at least one amplifier, a transceiver, a coupler, a low noise amplifier (LNA), a duplexer, and the like. In addition, RF circuit 910 may also communicate with the network and other devices via wireless communication. The wireless communication described above may use any communication standard or protocol, including, but not limited to, global system for mobile communications (GSM), general packet radio service (GPRS), code division multiple access (CDMA), wideband code division multiple access (WCDMA), long term evolution (LTE), email, short message service (SMS), and the like.

The memory 920 may be used to store software programs and modules, and the processor 980 executes various functional applications of the mobile phone as well as data processing by running the software programs and modules stored in the memory 920. The memory 920 may mainly include a storage program area and a storage data area, wherein the storage program area may store an operating system, an application required for at least one function, and the like, and the storage data area may store data or the like created in accordance with the use of the mobile phone. Furthermore, memory 920 may include high-speed random access memory, and may also include non-volatile memory, such as at least one disk storage device, flash memory device, or other volatile solid-state storage device.

The input unit 930 may be configured to receive input digital or character information and generate key signal inputs related to user settings and function control of the mobile phone. Specifically, the input unit 930 may include a fingerprint recognition module 931 and other input devices 932. The fingerprint recognition module 931 may collect fingerprint data of the user thereon. In addition to the fingerprint recognition module 931, the input unit 930 may include other input devices 932. Specifically, other input devices 932 may include, but are not limited to, one or more of a touchscreen, a physical keyboard, a function key (e.g., a volume control key, a switch key, etc.), a trackball, a mouse, an operating lever, and the like.

The display unit 940 may be used to display information input by the user or information provided to the user and various menus of the mobile phone. The display unit 940 may include a display screen 941 which may optionally be configured in the form of a liquid crystal display (LCD), an organic light-emitting diode (OLED), or the like. Although in FIG. 7, the fingerprint recognition module 931 and the display screen 941 are two independent components to implement the input and input functions of the mobile phone, in some embodiments, the fingerprint recognition module 931 may be integrated with the display screen 941 to implement the input and playback functions of the mobile phone.

The mobile phone may also include at least one sensor 950, such as a light sensor, a motion sensor, and other sensors. Specifically, the light sensor may include an ambient light sensor and a proximity sensor, wherein the ambient light sensor may adjust the brightness of the display screen 941 in accordance with light and darkness of ambient light, and the proximity sensor may turn off the display screen 941 and/or backlight when the mobile phone moves to the ear. As one of the motion sensors, the accelerometer sensor can detect the magnitude of acceleration in each direction (typically three-axis), the magnitude and direction of gravity can be detected at rest, and can be used to identify applications of mobile phone posture (such as horizontal and vertical screen switching, associated games, magnetometer posture calibration), vibration identification-related functions (such as pedometer, tap), and the like. Other sensors, such as a gyroscope, a barometer, a hygrometer, a thermometer, and an infrared sensor, which are also configurable for a mobile phone, are not described herein.

An audio circuit 960, a speaker 961, and a microphone 962 may provide an audio interface between a user and a mobile phone. The audio circuit 960 may transmit the received audio data converted electrical signal to the speaker 961, and convert the audio signal from the speaker 961 to a sound signal for playback. On the other hand, the microphone 962 converts the collected sound signal into an electrical signal, receives it by the audio circuit 960, converts it into audio data, processes it by the audio data playback processor 980, transmits it to another mobile phone, for example, via the RF circuit 910, or plays the audio data to the memory 920 for further processing.

WiFi belongs to a short-range wireless transmission technology, and the mobile phone can help the user receive and send e-mail, browse web pages, access streaming media, and the like through the WiFi module 970, which provides the user with wireless broadband Internet access. Although FIG. 7 shows the WiFi module 970, it is understood that it does not belong to the mandatory structure of the mobile phone and may be omitted as necessary without changing the essence of the disclosure.

The processor 980 is the control center of the mobile phone, connecting the parts of the entire mobile phone using various interfaces and lines, performing various functions and processing data of the mobile phone by running or executing a software program and/or module stored in the memory 920, and invoking data stored in the memory 920, thereby performing overall monitoring of the mobile phone. Optionally, processor 980 may include one or more processing units. Preferably, the processor 980 may integrate an application processor and a modem processor, wherein the application processor mainly processes an operating system, a user interface, an application program, and the like, and the modem processor mainly processes wireless communications. It is understood that the above-described modem processor may also not be integrated into the processor 980.

The mobile phone further includes a power source 990 (e.g., a battery) that supplies power to each component, preferably a power source that may be logically connected to the processor 980 via a power management system to enable management of functions such as charging, discharging, and power consumption management via a power management system.

Although not shown, the mobile phone may also include a camera, a Bluetooth module, and the like, and details are not described herein.

In the embodiment shown in FIG. 5, the flow of the terminal side in each step method may be implemented based on the structure of the mobile phone.

In the embodiment shown in FIG. 6A and FIG. 6B, each unit function may be implemented based on the structure of the mobile phone.

The steps of the method or algorithm described in the embodiments of the present disclosure may be implemented in a hardware manner, or may be implemented in a manner in which the processor executes software instructions. The software instructions may consist of corresponding software modules that may be stored in random access memory (RAM), flash memory, read-only memory (ROM), erasable programmable ROM (EPROM), electrically programmable EPROM (EEPROM), registers, hard disk, mobile hard disk, CD-ROM, or any other form of storage medium known in the art. One example storage medium is coupled to a processor so that the processor can read information from the storage medium and write information to the storage medium. Of course, the storage medium may also be an integral part of the processor. The processor and storage medium may be located in the ASIC. In addition, the ASIC may be located in an access network device, a target network device, or a core network device. Of course, processors and storage media may also be present as discrete components in an access network device, a target network device, or a core network device.

One skilled in the art should appreciate that in one or more of the above examples, the functions described in the embodiments of the present disclosure may be implemented in whole or in part by software, hardware, firmware, or any combination thereof. When implemented using software, it may be implemented in whole or in part in the form of a computer program product. The computer program product includes one or more computer instructions. When the computer program instructions are loaded and executed on a computer, all or part of the flow or function described in accordance with embodiments of the present disclosure is generated. The computer may be a general purpose computer, a dedicated computer, a computer network, or other programmable device. The computer instructions may be stored in a computer-readable storage medium or transmitted from one computer-readable storage medium to another computer-readable storage medium, for example, the computer instructions may be transmitted from one website, computer, server, or data center to another website, computer, server, or data center in a wired (e.g., coaxial cable, fiber, digital subscriber line (DSL)) or wireless (e.g., infrared, wireless, microwave, etc.) manner. The computer-readable storage medium may be any available medium accessible by a computer or a data storage device including one or more available media integrated servers, data centers, and the like. The usable medium may be a magnetic medium (e.g., floppy disk, hard disk, magnetic tape), an optical medium (e.g., digital video disc (DVD)), or a semiconductor medium (e.g., solid state disk (SSD)), or the like.

The objectives, the implementations and the advantageous effects of the present disclosure have been illustrated in detail by the specific embodiments described above. It should be understood that the above description is merely a specific embodiment of the embodiments of the present disclosure and is not intended to limit the protection scope of the embodiments of the present disclosure. Any modifications, equivalents, improvements, or the like made on the basis of the technical solutions of the embodiments of the present disclosure shall fall within the protection scope of the embodiments of the present disclosure.

What is claimed is:

1. A method of maintaining uplink synchronization of a terminal, comprising:
   triggering, by the terminal, an uplink alignment timer UAT, and receiving a timing advance command TAC within a duration of the UAT; and
   losing uplink synchronization in a case where the terminal does not receive the TAC within the duration of the UAT,
   wherein the UAT is corresponding to a time advance group TAG, and
   wherein the TAG comprises a time alignment timer TAT and the UAT, and the triggering, by the terminal, an uplink alignment timer UAT comprises one of the following:
   triggering, by the terminal, the UAT when the TAT fails; and
   triggering, by the terminal, the UAT when triggering the TAT, and the duration of the UAT is greater than or equal to a duration of the TAT.

2. The method of claim 1, wherein before the triggering, by the terminal, an uplink alignment timer UAT, the method further comprises one of the following:
   obtaining, by the terminal, configuration information of the UAT through radio resource control RRC signaling; and
   acquiring, by the terminal, the configuration information of the UAT through system broadcast information.

3. The method of claim 1, wherein when the TAT fails, the method further comprises: the terminal interrupting response to:
   clearing a hybrid automatic repeat request HARQ buffer, clearing a physical uplink control channel PUCCH resource, and marking a running TAT other than the TAT as failed.

4. The method of claim 1, further comprising one of the following:
   transmitting, by the terminal, uplink time alignment request information through a first cell within the duration of the UAT, wherein the first cell is a cell corresponding to a TAG other than the TAG of a first media access control MAC entity; and
   transmitting, by the terminal, uplink time alignment request information through a second cell within a duration of the UAT, wherein the second cell is a cell corresponding to a TAG of a second MAC entity, and the second MAC entity is different from the first MAC entity,
   wherein the uplink time alignment request information is used to notify a target cell that the TAT comprised in the TAG corresponding to the UAT has failed, so that the target cell transmits a preset configuration resource on a downlink channel, the preset configuration resource is used by the terminal to transmit uplink data on the target cell having the failed TAT, and the target cell is a cell that needs to obtain an uplink time adjustment amount again.

5. The method of claim 4, further comprising one of the following:
   receiving, by the terminal, a time adjustment instruction comprising an uplink time adjustment amount and a target TAG ID through the first cell; and
   receiving, by the terminal, a time adjustment instruction comprising an uplink time adjustment amount, a first MAC entity identity ID, and a target TAG ID through the second cell.

6. The method of claim 5, further comprising:
   receiving, by the terminal, preset information, wherein the preset information comprises the uplink time adjustment amount,
   wherein one of the following:
   the uplink time adjustment amount is determined by the first cell according to a relative position between the first cell and the target cell;
   the uplink time adjustment amount is determined by the second cell according to a relative position between the second cell and the target cell; and
   the uplink time adjustment amount is determined by the target cell according to a received preset uplink control information, which comprises a scheduling request SR or a sounding reference signal SRS.

7. The method of claim 1, further comprising:
   performing, by the terminal, in a case where the UAT fails, at least one of:
   determining that the target cell loses uplink synchronization, clearing hybrid automatic repeat request HARQ buffer for all serving cells, notifying radio resource control RRC entity to release PUCCH and SRS resources for all serving cells, clearing configured downlink allocation and uplink authorization, and marking a running TAT other than the TAT as failed.

8. A terminal comprising a processing unit and a communication unit,
   the processing unit is configured to trigger an uplink alignment timer UAT, and request a timing advance command TAC through the communication unit within a duration of the UAT, and to lose uplink synchronization in a case where no TAC is received within the duration of the UAT,
   wherein the UAT is corresponding to a time advance group TAG, and
   wherein the TAG comprises a time alignment timer TAT and the UAT, and for triggering the UAT, the processing unit is configured to perform one of the following:
   trigger the UAT when the TAT fails; and
   trigger the UAT when the TAT is triggered, and the duration of the UAT is greater than or equal to a duration of the TAT.

9. The terminal of claim 8, wherein the processing unit is further configured to perform one of the following:
   obtain configuration information of the UAT through radio resource control RRC signaling before triggering the UAT; and
   obtain configuration information of the UAT through system broadcast information before triggering the UAT.

10. The terminal of claim 8, wherein the processing unit is further configured to, when the TAT fails, interrupt response to:
    clearing a hybrid automatic repeat request HARQ buffer, clearing a physical uplink control channel PUCCH resource, and marking a running TAT other than the TAT as failed.

11. The terminal according to claim 8, wherein the processing unit is further configured to perform one of the following:
    transmit uplink time alignment request information through a first cell within the duration of the UAT, wherein the first cell is a cell corresponding to a TAG other than the TAG of a first media access control MAC entity; and transmit uplink time alignment request information through a second cell within the duration of the UAT, wherein the second cell is a cell corresponding to a TAG of a second MAC entity, and the second MAC entity is different from the first MAC entity, wherein the uplink time alignment request information is used to notify a target cell that the TAT comprised in the TAG corresponding to the UAT has failed, so that the target cell transmits a preset configuration resource on a downlink channel, the preset configuration resource is used by the terminal to transmit uplink data on a target cell having the failed TAT, and the target cell is a cell that needs to obtain an uplink time adjustment amount again.

12. The terminal of claim 11, wherein the processing unit is further configured to perform one of the following:

receive a time adjustment instruction through the communication unit through the first cell, the time adjustment instruction comprising an uplink time adjustment amount and a target TAG ID; and receive a time adjustment instruction through the communication unit through the second cell, the time adjustment instruction comprising an uplink time adjustment amount, a first MAC entity identity ID, and a target TAG ID.

13. The terminal of claim 11, wherein the processing unit is further configured to receive preset information through the communication unit, the preset information comprising the uplink time adjustment amount, wherein one of the following:

the uplink time adjustment amount is determined by the first cell according to a relative position between the first cell and the target cell;

the uplink time adjustment amount is determined by the second cell according to a relative position between the second cell and the target cell; and the uplink time adjustment amount is determined by the target cell according to a received preset uplink control information, which comprises a scheduling request SR or a sounding reference signal SRS.

14. The terminal of claim 8, wherein the processing unit is further configured to, when the UAT fails, perform at least one of:

determining that the target cell loses uplink synchronization, clearing hybrid automatic repeat request HARQ buffer for all serving cells, notifying radio resource control RRC entity to release PUCCH and SRS resources for all serving cells, clearing configured downlink allocation and uplink authorization, and marking a running TAT other than the TAT as failed.

15. A terminal comprising a processor, a memory and a transceiver, the processor being communicatively connected to the memory and the transceiver, wherein the memory stores program code and data, and the processor is configured to invoke the program code and the data in the memory to perform:

triggering an uplink alignment timer UAT, and requesting a timing advance command TAC through the transceiver within a duration of the UAT, and to lose uplink synchronization in a case where no TAC is received within the duration of the UAT, wherein the UAT is corresponding to a time advance group TAG, and wherein the TAG comprises a time alignment timer TAT and the UAT, and the triggering, by the terminal, an uplink alignment timer UAT comprises one of the following:

triggering, by the terminal, the UAT when the TAT fails; and triggering, by the terminal, the UAT when triggering the TAT, and the duration of the UAT is greater than or equal to a duration of the TAT.

16. The terminal of claim 15, wherein the processor is further configured to perform one of the following:

obtain configuration information of the UAT through radio resource control RRC signaling before triggering the UAT; and obtain configuration information of the UAT through system broadcast information before triggering the UAT.

* * * * *